(12) United States Patent
Aoyagi et al.

(10) Patent No.: US 7,797,573 B2
(45) Date of Patent: Sep. 14, 2010

(54) MEMORY MANAGEMENT METHOD AND PORTABLE TERMINAL DEVICE

(75) Inventors: Katsumi Aoyagi, Tokyo (JP); Tomohiro Ichikawa, Tokyo (JP); Yoshinori Motoyama, Tokyo (JP); Satoshi Hirano, Tokyo (JP); Toshihisa Sanbommatsu, Tokyo (JP); Toru Hayami, Tokyo (JP); Tadashi Kamohara, Chiba (JP); Kazutoshi Nagatani, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 565 days.

(21) Appl. No.: 11/882,175

(22) Filed: Jul. 31, 2007

(65) Prior Publication Data
US 2008/0034252 A1 Feb. 7, 2008

(30) Foreign Application Priority Data
Aug. 4, 2006 (JP) ............................. 2006-212751

(51) Int. Cl.
G06F 11/00 (2006.01)
(52) U.S. Cl. .......................................... 714/8; 711/103
(58) Field of Classification Search ..................... 714/5, 714/8
See application file for complete search history.

(56) References Cited

U.S. PATENT DOCUMENTS

| 6,601,167 | B1 * | 7/2003 | Gibson et al. ................... 713/2 |
| 7,336,537 | B2 * | 2/2008 | Louie et al. ............. 365/185.09 |
| 7,502,259 | B2 * | 3/2009 | Gorobets ............... 365/185.11 |
| 7,508,708 | B2 * | 3/2009 | Roohparvar ........... 365/185.09 |
| 2003/0022665 | A1 | 1/2003 | Rajaram |
| 2004/0015754 | A1 * | 1/2004 | Callaway et al. ............. 714/719 |
| 2004/0111555 | A1 * | 6/2004 | Gonzalez et al. ............. 711/103 |
| 2005/0283647 | A1 * | 12/2005 | Ishidoshiro et al. ............. 714/5 |
| 2006/0149890 | A1 * | 7/2006 | Gorobets ..................... 711/103 |
| 2006/0184722 | A1 * | 8/2006 | Sinclair ...................... 711/103 |
| 2006/0282610 | A1 * | 12/2006 | Dariel et al. ................. 711/103 |

FOREIGN PATENT DOCUMENTS

| GB | 2 403 303 | 12/2004 |
| WO | WO-98/54639 | 12/1998 |
| WO | WO-2004/031961 | 4/2004 |

OTHER PUBLICATIONS

Extended European Search Report issued Apr. 29, 2009 in corresponding European Application No. 07 25 2969.

* cited by examiner

*Primary Examiner*—Scott T Baderman
*Assistant Examiner*—Kamini Patel
(74) *Attorney, Agent, or Firm*—Rader, Fishman & Grauer PLLC (57) ABSTRACT

A memory management method for managing a non-volatile memory into which writing is performed in units of blocks includes the steps of assigning a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block; storing at least correspondence information between the blocks of the substitution area and a defective block of a substitution target as management information within the management area; and using the block of the substitution area in place of the defective block on the basis of the correspondence information when the defective block is to be used.

14 Claims, 12 Drawing Sheets

| |
|---|
| Block 0 BootCode |
| Block 1 MANAGEMENT AREA 1 |
| Block 2 MANAGEMENT AREA 2 |
| Block 3 INTERFERENCE AREA 1 |
| Block 4 INTERFERENCE AREA 2 |
| Block 5 SUBSTITUTION AREA 1 |
| Block 6 SUBSTITUTION AREA 2 |
| Block 7 SUBSTITUTION AREA 3 |
| Block 8 SUBSTITUTION AREA 4 |
| Block 9 SUBSTITUTION AREA 5 |
| Block 10 SUBSTITUTION AREA 6 |
| Block 11 SUBSTITUTION AREA 7 |
| Block 12 SUBSTITUTION AREA 8 |
| Block 13 SUBSTITUTION AREA 9 |
| Block 14 SUBSTITUTION AREA 10 |
| Block 15 Code AREA 1 |
| Block 16 Code AREA 2 |
| ⋮ |
| Block N Code AREA n |
| Block N+1 Code AREA n+1 |
| Block N+2 Code AREA n+2 |
| Block N+3 Code AREA n+3 |
| Block N+4 Code AREA n+4 |
| ⋮ |
| Block M−4 Code AREA m−4 |
| Block M−3 Code AREA m−3 |
| Block M−2 Code AREA m−2 |
| Block M−1 Code AREA m−1 |
| Block M Code AREA m |

| |
|---|
| Block 0 BootCode |
| Block 1 MANAGEMENT AREA 1 (ORIGINAL) |
| Block 2 MANAGEMENT AREA 2 (DUPLICATE) |
| Block 3 INTERFERENCE AREA 1 |
| Block 4 INTERFERENCE AREA 2 |
| Block 5 SUBSTITUTION AREA 1 |
| Block 6 SUBSTITUTION AREA 2 |
| Block 7 SUBSTITUTION AREA 3 |
| Block 8 SUBSTITUTION AREA 4 |
| Block 9 SUBSTITUTION AREA 5 |
| Block 10 SUBSTITUTION AREA 6 |
| Block 11 SUBSTITUTION AREA 7 |
| Block 12 SUBSTITUTION AREA 8 |
| Block 13 SUBSTITUTION AREA 9 |
| Block 14 SUBSTITUTION AREA 10 |
| Block 15 Code AREA 1 |
| Block 16 Code AREA 2 |
| ... |

FIG. 9B

| |
|---|
| Block 0 BootCode |
| Block 1 MANAGEMENT AREA 1 (ORIGINAL) |
| Block 2 BAD Block |
| Block 3 INTERFERENCE AREA 1 |
| Block 4 INTERFERENCE AREA 2 |
| Block 5 SUBSTITUTION AREA 1 |
| Block 6 SUBSTITUTION AREA 2 |
| Block 7 SUBSTITUTION AREA 3 |
| Block 8 SUBSTITUTION AREA 4 |
| Block 9 SUBSTITUTION AREA 5 |
| Block 10 SUBSTITUTION AREA 6 |
| Block 11 SUBSTITUTION AREA 7 |
| Block 12 SUBSTITUTION AREA 8 |
| Block 13 SUBSTITUTION AREA 9 |
| Block 14 SUBSTITUTION AREA 10 |
| Block 15 Code AREA 1 |
| Block 16 Code AREA 2 |
| ... |

FIG. 9C

| |
|---|
| Block 0 BootCode |
| Block 1 MANAGEMENT AREA 1 (DUPLICATE) |
| Block 2 BAD Block |
| Block 3 MANAGEMENT AREA 2 (ORIGINAL) |
| Block 4 INTERFERENCE AREA 1 |
| Block 5 INTERFERENCE AREA 2 |
| Block 6 SUBSTITUTION AREA 1 |
| Block 7 SUBSTITUTION AREA 2 |
| Block 8 SUBSTITUTION AREA 3 |
| Block 9 SUBSTITUTION AREA 4 |
| Block 10 SUBSTITUTION AREA 5 |
| Block 11 SUBSTITUTION AREA 6 |
| Block 12 SUBSTITUTION AREA 7 |
| Block 13 SUBSTITUTION AREA 8 |
| Block 14 SUBSTITUTION AREA 9 |
| Block 15 Code AREA 1 |
| Block 16 Code AREA 2 |
| ... |

FIG. 10

| |
|---|
| Block 0 BootCode |
| Block 1 BAD Block |
| Block 2 MANAGEMENT AREA 1 |
| Block 3 MANAGEMENT AREA 2 |
| Block 4 INTERFERENCE AREA 1 |
| Block 5 INTERFERENCE AREA 2 |
| Block 6 SUBSTITUTION AREA 1 |
| Block 7 SUBSTITUTION AREA 2 USED |
| Block 8 SUBSTITUTION AREA 3 USED |
| Block 9 SUBSTITUTION AREA 4 USED |
| Block 10 SUBSTITUTION AREA 5 USED |
| Block 11 SUBSTITUTION AREA 6 BAD Block |
| Block 12 SUBSTITUTION AREA 7 USED |
| Block 13 SUBSTITUTION AREA 8 USED |
| Block 14 SUBSTITUTION AREA 9 USED |
| Block 15 Code AREA 1 |
| Block 16 Code AREA 2 |
| ⋮ |

⇨

| |
|---|
| Block 0 BootCode |
| Block 1 BAD Block |
| Block 2 MANAGEMENT AREA 1 |
| Block 3 MANAGEMENT AREA 2 |
| Block 4 INTERFERENCE AREA 1 |
| Block 5 INTERFERENCE AREA 2 |
| Block 6 SUBSTITUTION AREA 1 USED |
| Block 7 SUBSTITUTION AREA 2 USED |
| Block 8 SUBSTITUTION AREA 3 USED |
| Block 9 SUBSTITUTION AREA 4 USED |
| Block 10 SUBSTITUTION AREA 5 USED |
| Block 11 SUBSTITUTION AREA 6 BAD Block |
| Block 12 SUBSTITUTION AREA 7 USED |
| Block 13 SUBSTITUTION AREA 8 USED |
| Block 14 SUBSTITUTION AREA 9 USED |
| Block 15 Code AREA 1 |
| Block 16 Code AREA 2 |
| ⋮ |

FIG. 14

MEMORY MANAGEMENT METHOD AND PORTABLE TERMINAL DEVICE

CROSS REFERENCES TO RELATED APPLICATIONS

The present invention contains subject matter related to Japanese Patent Application JP 2006-212751 filed in the Japanese Patent Office on Aug. 4, 2006, the entire contents of which are incorporated herein by reference.

BACKGROUND OF THE INVENTION

1. Field of the Invention

The present invention relates to a non-volatile memory into which writing is performed in units of blocks and, more particularly, relates to a memory management method therefor and a portable terminal device using the non-volatile memory.

2. Description of the Related Art

For portable terminal devices (also referred to simply as "portable terminals"), including portable phone terminals, a flash memory is used as a rewritable, non-volatile semiconductor memory. Among the flash memories, there are NAND and NOR types. A NAND-type flash memory (hereinafter also referred to as a "NAND memory") has the features that it is suitable for implementation of a large-capacity storage device, the cost per unit capacity is low, but reading and writing in only units of blocks of a fixed size are possible, and random access is slow. On the other hand, a NOR-type flash memory has the features that the reading and writing speed are high, high-speed random access is possible, but it is not suitable for a high degree of integration, and a large electrical current is necessary for writing.

Accordingly, a NAND memory that is advantageous in terms of cost, degree of integration, and power consumption is used for storing a program of a portable terminal. When booting from a NAND memory, a program area is temporarily transferred from a NAND memory to a RAM, such as SDRAM (Synchronous Dynamic Random Access Memory), and the program is executed in the RAM. For this reason, the program main body is resident in the NAND memory.

It is common that defective blocks are already present in a NAND memory before shipment. Furthermore, it is necessary to consider that the NAND memory will deteriorate with use, and a block that was a good block initially will become defective.

SUMMARY OF THE INVENTION

In software of electronic devices, such as portable terminals, it is common practice that errors called bugs are corrected, and version updating is performed to add and improve functions.

When performing version updating, a program is stored in a NAND memory using a loader or the like. In this case, a method is usually employed in which defective blocks are skipped, and a program is loaded into a NAND memory.

When a defective block occurs late, in the case that the entire area of the program is loaded into the NAND memory, no problem occurs. However, when a difference file before and after updating is to be created, as in the updating of software using difference data, the address continuity of the program before updating is lost due to the occurrence of a defective block that occurs late, matching with a file for updating is difficult to achieve, and program updating is difficult to perform. Even if program updating can be performed, the content of the block and that of subsequent blocks need to be shifted by an amount corresponding to one block and to be rewritten. As a result, only the updating of the difference file is not sufficient, and there is a problem in that the advantages of updating software using a difference file are impaired.

In such a background, the present invention provides a memory management method suitable for updating software using a difference file with respect to a non-volatile memory into which writing is performed in units of blocks and a portable terminal device using the memory management method.

According to an embodiment of the present invention, there is provided a memory management method for managing a non-volatile memory into which writing is performed in units of blocks, the memory management method including the steps of: assigning a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area; storing at least correspondence information between the blocks of the substitution area and a defective block of a substitution target as management information within the management area; and using the block of the substitution area in place of the defective block on the basis of the correspondence information when the defective block is to be used.

In this memory management method, a plurality of blocks of a non-volatile memory are divided into a "management area", a "code area", a "substitution area", and an "interference area", and the interference area is arranged between the management area and the substitution area. With this configuration, it is possible to use the substitution area in common for both the management area and the code area. Furthermore, by providing a management area in the non-volatile memory, it is possible to perform substitution management of defective blocks without externally providing special memory management means.

As a more specific embodiment, when a block of the management area becomes defective, the interference area is shifted to a block having a memory address closer to the interference area within the substitution area, so that one block of the original interference area is set as a new management area. The blocks of the substitution area are used in an order starting from the block having a memory address farthest from the interference area. As a result, the interference area functions as a boundary between the management area and the substitution area, the position of the boundary being variable, and the blocks of the substitution area can be used for both the management area and the substitution area.

According to another embodiment of the present invention, there is provided a portable phone terminal including a non-volatile memory into which writing is performed in units of blocks and control means for assigning a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area, and for using the areas, wherein the control means stores at least correspondence information between the blocks of the substitution area and a defective block of a substitution target as management information within the management area, and uses the block of the substitution area in place of the defective block on the basis of the correspondence information when the defective block is to be used.

According to an embodiment of the present invention, even when a defective block that occurs late occurs in a non-volatile memory, by substituting for the defective block with a block in a substitution area, it is easy to perform software updating on the basis of a file for updating using a difference.

Even when a defective block that occurs late occurs in a management area, by shifting the management area toward the substitution area side and by using the original interference area as a new management area, it is substantially possible to use a block in the substitution area for both the management area and a code area. That is, it is possible to effectively use all the blocks of the substitution area without being limited to the use of a fixed number of blocks of the substitution area.

By using at least two blocks for storing management information as the management area, it is not necessary to back up the management information externally.

By storing management information on the substitution of a defective block by using a block in the substitution area within at least one block of a non-volatile memory and by using the management information, there is no need to provide special logical/physical address conversion means, such as an MMU.

DESCRIPTION OF THE PREFERRED EMBODIMENTS

Preferred embodiments of the present invention will be described below in detail with reference to the drawings.

Figure 1:
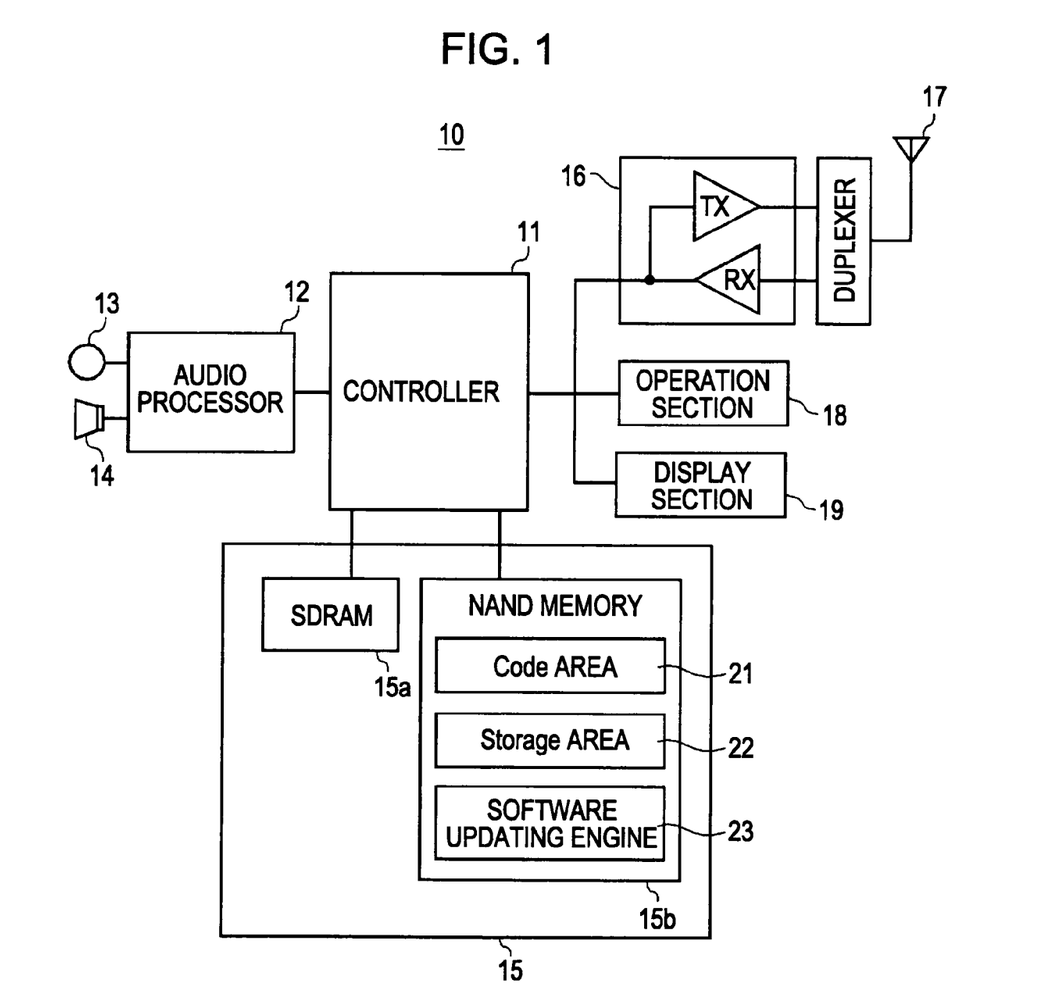
FIG. 1 shows the schematic configuration of hardware of a portable terminal 10 according to an embodiment of the present invention.

FIG. 1 shows the schematic configuration of hardware of a portable terminal 10 according to an embodiment of the present invention. The portable terminal 10 includes a controller 11, an audio processor 12, a microphone 13, a speaker 14, a storage section 15, a communication section 16, an antenna 17, an operation section 18, and a display section 19.

The controller 11 includes processors, such as a central processing unit (CPU) and a digital signal processor (DSP), and controls processing of the portable terminal 10 and each section. Under the control of the controller 11, the audio processor 12 performs audio processing, such as phone conversation and music reproduction, performs audio input from the microphone 13 and audio output to the speaker 14.

The storage section 15 is a part for storing programs and data, and includes an SDRAM 15a and a NAND memory 15b in this embodiment.

The NAND memory 15b is a rewritable non-volatile memory for storing a program executed by the controller 11. The NAND memory 15b has a code area 21 for storing code (program code) of a program main body and a storage area 22 for storing a file for updating. In the storage area 22, a program as well as various kinds of data, such as a telephone directory, electronic mail, Web content, music, and images can be stored.

The code area 21 is loaded into the SDRAM 15a at a boot time, and a program is executed in the SDRAM 15a. More specifically, when power is supplied to the controller 11 and the storage section 15, the content of the boot area of the NAND memory 15b is read into a memory area contained in the controller and executed by an embedded logic of the controller 11. A defective block management method defined by the present invention is embedded in this program. This program allows program code to be executed, that is, to be loaded from the NAND memory 15b into the SDRAM 15a, and the program is executed in the SDRAM 15a. A file for updating is created in advance by a dedicated tool outside the portable terminal 10, downloaded from a dedicated server via the communication section 16, and stored in the storage area 22.

In the present invention, a management area is provided in a consecutive area in the NAND memory, and management information is stored in the management area, so that management of defective blocks and block substitution management (to be described later) are performed. The "block" in this specification refers to a grouped unit area of a specific size defined for each memory device.

The communication section 16 is a part for performing transmission and reception in a wireless manner with a base station (not shown) via the antenna 17. The operation section 18 includes a ten-keypad, various kinds of control keys, and the like, and has a function of inputting instructions and information from a user to the controller 11. The display section 19 includes, for example, a display device, such as an LCD or an organic EL, and has a function of displaying visible information, such as text and images (still images, moving images) to the user.

Figure 2:
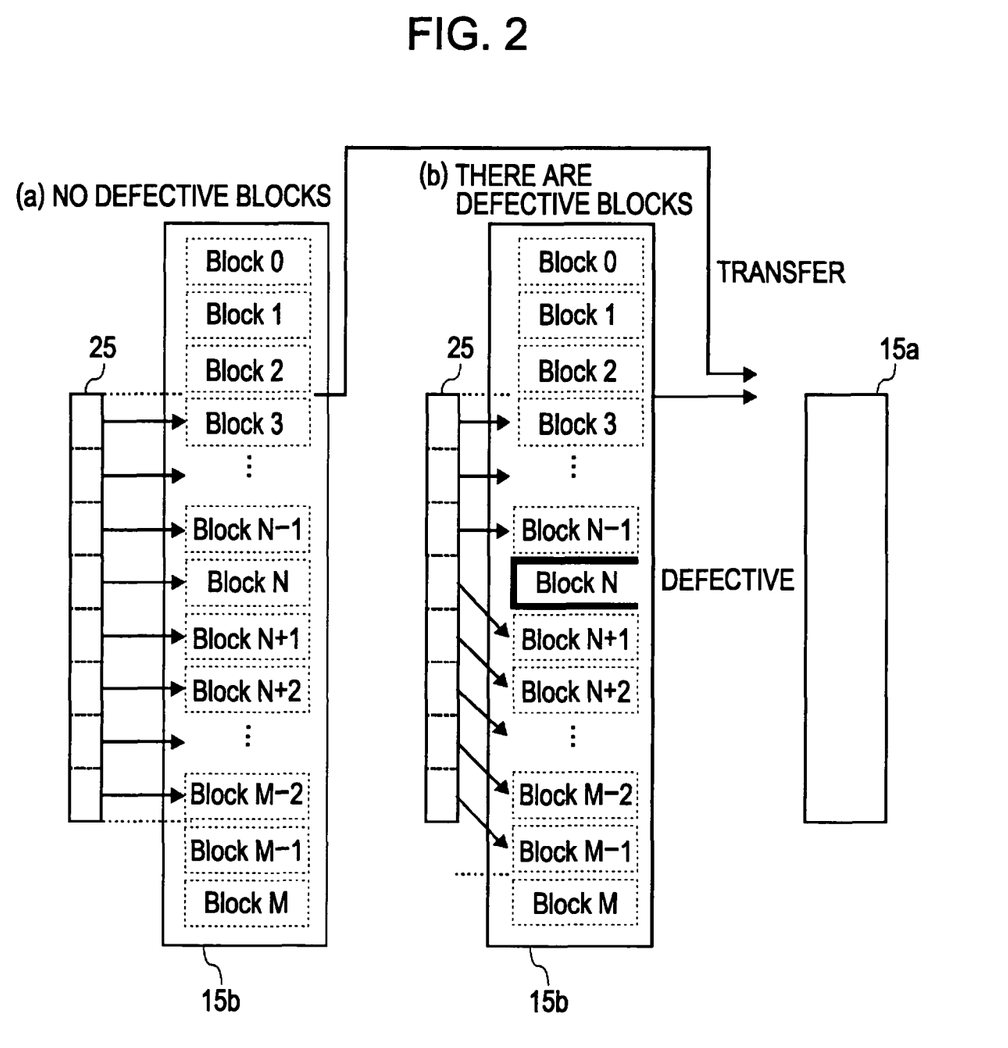
FIG. 2 shows an example in which a program area is stored in a specific block of a NAND memory shown in FIG. 1 and subsequent blocks.

As described above, when starting a boot program from the NAND memory 15b, the program is loaded from the NAND memory 15b into the SDRAM 15a, and the program is executed in the SDRAM 15a. FIG. 2 shows an example in which a program area is stored in block 3 of the NAND memory 15b and subsequent blocks. When a program is written into the NAND memory 15b, as shown in part (b) of FIG. 2, if a certain "block N" is defective, the defective block is not used, and the program is written into the next non-defective "block N+1". Since the program is executed in the SDRAM 15a, this suffices.

When a defect is detected in a block N of the NAND memory 15b, the program is stored in a block N+1 with the block N being skipped. In this method, the entire program is updated. However, in this method, when software updating using a file for updating (difference file) is performed, an inconvenience occurs.

Figure 3:
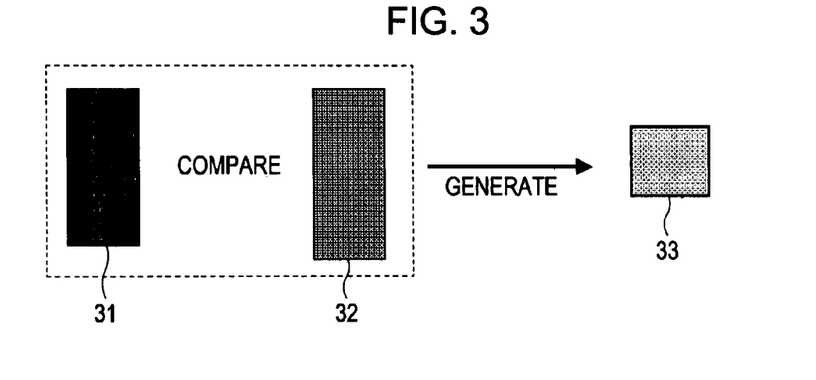
FIG. 3 schematically shows a state in which a program before updating is compared with a program after updating and a file for updating as a difference file is created.

As schematically shown in FIG. 3, a file 33 for updating is created as a difference file by comparing a program 31 before updating with a program 32 after updating. Usually, the size (the amount of data) of the file 33 for updating is smaller than the program 32 after updating. There is an advantage that the time necessary for downloading and the updating process is shorter than that of the entire program 32 after updating.

Figure 4:
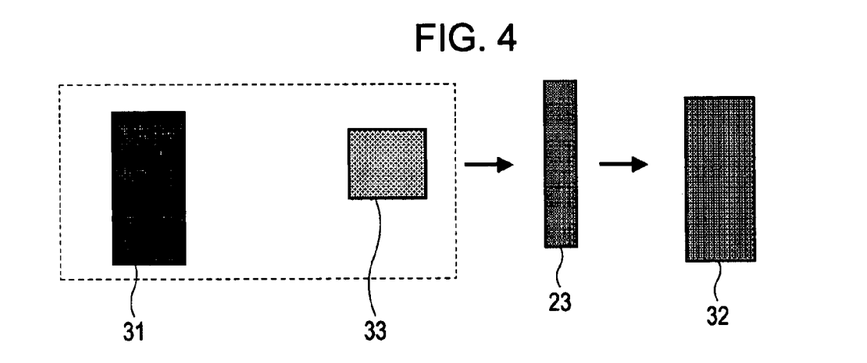
FIG. 4 schematically shows a state in which a program before updating is updated by a software updating engine on the basis of a file for updating.

As shown in FIG. 4, when software updating is to be performed, the file 33 for updating is stored in the storage area 22 of the NAND memory 15b inside the portable terminal. On the basis of this file for updating, a software updating engine 23 performs an updating process on the program 31 before updating stored in the code area 21 of the NAND memory 15b, and creates the program 32 after updating in the NAND memory. The software updating engine 23 is stored, for example, in the NAND memory 15b. During an updating process, the software updating engine 23 is temporarily copied to the RAM 15a, and the software updating engine 23 inside the RAM 15a is performed, thereby making it possible to implement software updating.

Figure 5:
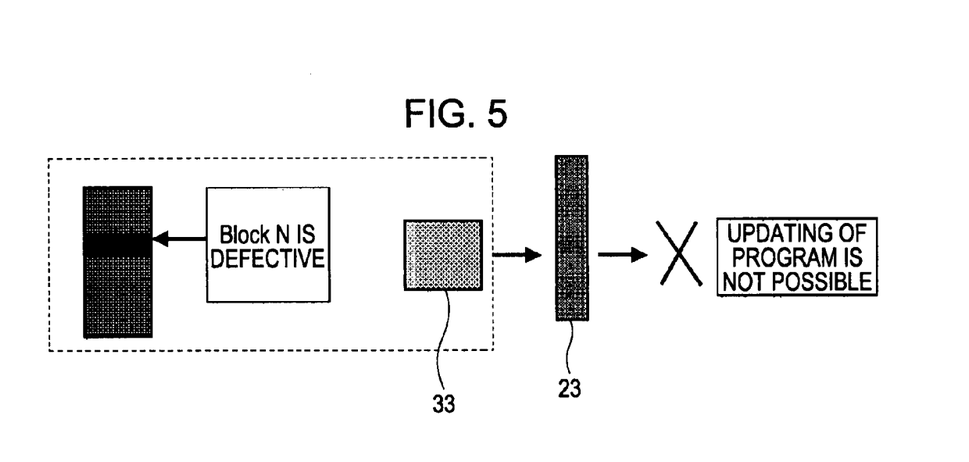
FIG. 5 illustrates problems during program updating within a NAND memory using a file for updating when a defective block occurs in the NAND memory.

Since the program is stored in the NAND memory, in the related art, no problem is posed when all the blocks of the NAND memory are non-defective. However, as shown in FIG. 5, when a defective block N occurs late, the address continuity of the program before updating is lost, matching with the file for updating is not achieved, and program updating is difficult to perform. If program updating can be performed, for that defective block and subsequent blocks, the program is shifted and stored. As a result, writing into a block, which is not originally necessarily, is necessary.

In this embodiment, substitution blocks that can be associated with defective blocks of the NAND memory are provided in advance, and the physical addresses of the defective blocks and the substitution blocks are managed using logical addresses, making it possible to ensure the address continuity of the NAND memory. By using a file for updating (difference file), before and after software is updated, which is created on the assumption of the consecutive addresses, and it is possible to perform software updating even when a defective block occurs late in the NAND memory.

A description of a method for enabling software updating even when a defective block that occurs late occurs in a NAND memory in which a program before updating is stored will be given below.

Figure 6:
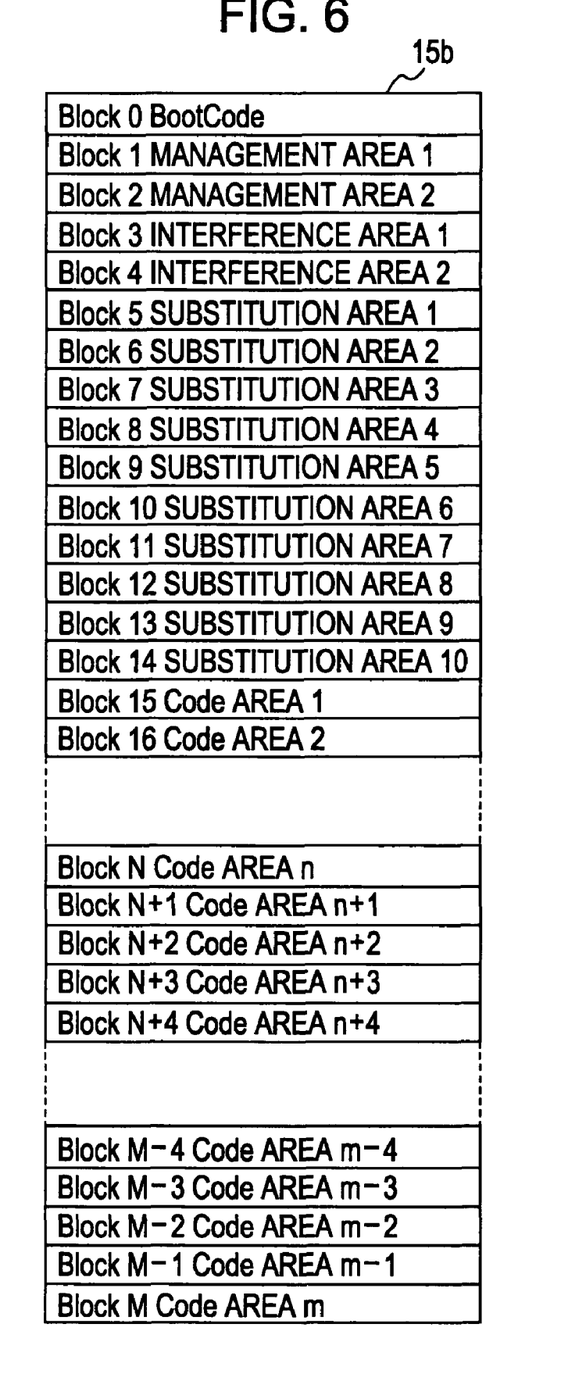
FIG. 6 shows an example of the internal configuration of a memory space of a NAND memory 15b in an embodiment of the present invention.

FIG. 6 shows an example of the internal configuration of a memory space of the NAND memory 15b in this embodiment. The NAND memory 15b is divided into blocks corresponding to a plurality of amounts of unit data, and functions are assigned to corresponding blocks as shown in FIG. 6. The state of FIG. 6 is a state in which functions are assigned at an initial period, and this state can change, as will be described later.

A boot code is located in the beginning block (block 0) of the NAND memory 15b. The operation of this embodiment is performed using block 1 and subsequent blocks.

In the example shown in FIG. 6, two blocks that follow block 0, that is, block 1 and block 2, are used as a "management area 1" and a "management area 2", respectively. The "management areas" are areas for storing management information for managing defective blocks and substitution blocks of the NAND memory. The details of the management information will be described later. A plurality of sets of management areas are provided as measures against loss (corruption) of management information due to, for example, power disconnection when writing into the NAND memory is being performed.

Following the "management area 2", an "interference area 1" and an "interference area 2" are provided in blocks 3 and 4, respectively. The "interference area" is an area used to identify the boundary between the management area and the substitution area.

Following the block 4 of the "interference area 2", blocks 5 to 14 are set as substitution areas. The substitution areas are allocated as areas for substituting for defective blocks. In the example shown in FIG. 6, 10 blocks are allocated as the substitution areas. This number of blocks is adjusted to an optimum value by considering the capacity of a NAND memory to be used.

In the block (block 15) next to the substitution area and subsequent blocks, code areas in which a program is actually stored exist.

Figure 7:
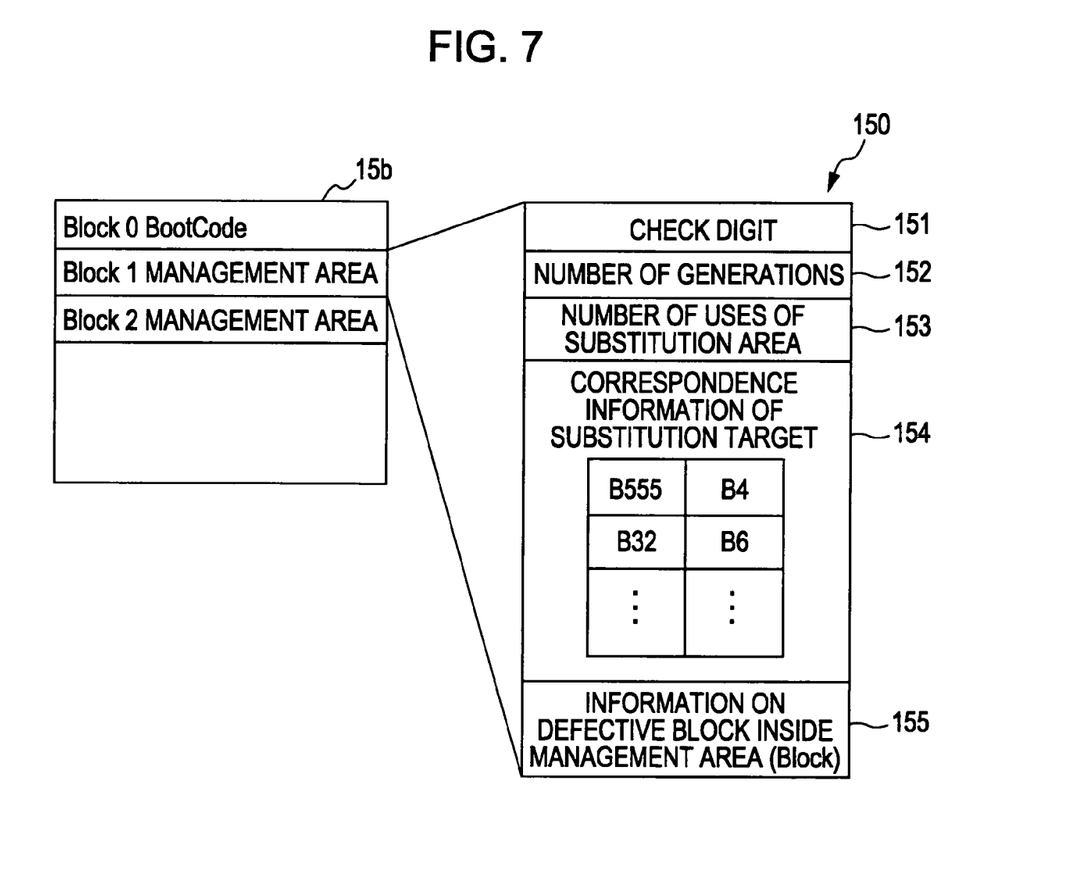
FIG. 7 illustrates the internal configuration of a management area and information stored therein in an embodiment of the present invention.

With reference to FIG. 7, a description now will be given of the internal configuration of management areas and information stored therein in this embodiment. The following information is stored in one block 150 of the management area.

(1) A check digit 151: check data, such as a checksum, for checking the corruption of data within one management area (block). This enables a determination as to an incompletely written state within a block when, for example, power is switched off while data is being written.

(2) A generation number 152: generation information indicating the generation when the management information within a management area (block) is updated. For example, this is a number that increases in sequence.

(3) A number 153 of uses of substitution areas: the number of used blocks among a plurality of blocks provided as a substitution area. In place of this number, the number of unused blocks may be used. Since the initial number of blocks of substitution areas is a known value (here, 10), if one of the number of used blocks and the number of unused blocks is known, the other number can be known. As will be described later, there is a case in which a block of the substitution area becomes defective, and such a defective block corresponds to a "used" block.

(4) Correspondence information 154 of a substitution target: when an unused non-defective block of a substitution area is assigned as a substitution target of a specific block, this correspondence information is information indicating the correspondence therebetween. Here, block numbers of defective blocks and block numbers of a substitution area are stored in such a manner as to correspond to each other. In this example, a maximum of 10 pieces of information can be stored.

(5) Information 155 on defective blocks within a management area (blocks 1 to 14): the management area, the interference area, and the substitution area (blocks 1 to 14 in the example of FIG. 6) are areas for management. When a block of one of them becomes defective, this information on defective blocks within the management area is information (here, a block number) for specifying the recorded defective block. When a certain block of an area for management is to be used, in the case in which the block has been recorded as being defective, the block is skipped and the next block is used.

A description now will be given, with reference to FIG. 8, of an operation when a defective block that occurs late is detected when writing into a block is performed (when software updating is performed). It is assumed that a defect is detected in block N+3 and writing is determined not to be possible. This block N+3 is marked as a bad block, and the use thereof is prohibited hereinafter. Code to be written into block N+3 is written in a substitution area 10 in a substituted manner rather than in the next block N+4. This substitution information is stored in the "management area 1". In this example, substitution information such that the substitution area 10 is substituted for with block N+3 is stored.

By performing the management of defective blocks and substitution blocks using management information in the manner described above, it is possible to make an actual physical address correspond to a logical address and to convert a logical address to a physical address. Also, by referring to a logical address, the continuity of the memory address can be ensured. According to such a conversion of logical address to a physical address using substitution information stored in the management area, there is no need to externally provide special address conversion means, such as a known memory management unit (MMU).

Next, a description will be given, with reference to FIG. 9, of an operation performed when a block of the management area becomes defective. In this embodiment, as described above, for the management area, two areas of original and duplicate are managed using a "management area 1" and a "management area 2". The "management area 1" and the "management area 2" are alternately used, and the side that is used becomes an "original" and the other becomes a "duplicate". For storing information in the management area, there are two methods: one in which management information for one generation is stored in one block; and the other in which management information for a plurality of generations are additionally written in one block, and when additional writing to the original area becomes not possible, switching between the "original" and "duplicate" is performed. At this point, for the sake of simplicity of description, the former method will be described.

The reason why two areas are provided is as follows. On account of the characteristics of a memory to which the present invention is applied, when information is to be newly recorded at a place where information has already been recorded, it is necessary to perform an operation of erasing the block once in order to delete the information recorded therein. If the management area is updated using only one area, in the case in which some trouble occurs due to power disconnection or the like when the management area is erased, the current management information is lost. In order to prevent such a malfunction, a block for storing up-to-date information is separated from a block in which an erasure operation is performed and management information that is newly updated is written. In a concrete operation of updating a management area, when updating of the management area needs to be performed, a "duplicate" area is erased, information read from an "original" area is updated, and writing is performed to the "duplicate" area using a new generation number. When this writing is completed, the exchange of the original area and the duplicate area is completed. The old "duplicate" area is changed to an "original" area, and the old "original" area is changed to a "duplicate" area.

The writing of management information is performed in such a manner that a copy of the "original" management area that has been read into the RAM in advance is updated and the management information is written into the management area that has been a "duplicate" thus far (as an updating method, there can be a method of creating a copy from the "original" area to a memory when the updating of the management information becomes necessary. However, in this embodiment, by considering efficiency during execution, it is assumed a copy of up-to-date management information has been read into the memory in advance and stays resident). For distinguishing between the original and duplicate of the management information, the generation number 152 attached to the management information are compared with each other, and the area that has been recorded more recently is handled as an "original".

Figure 9A:
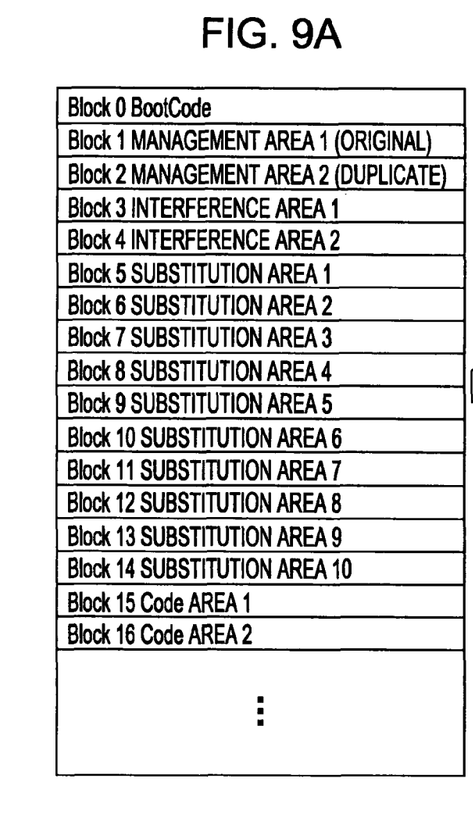
FIG. 9 illustrates an operation when a management area becomes a defective block in an embodiment of the present invention.
Figure 9B:
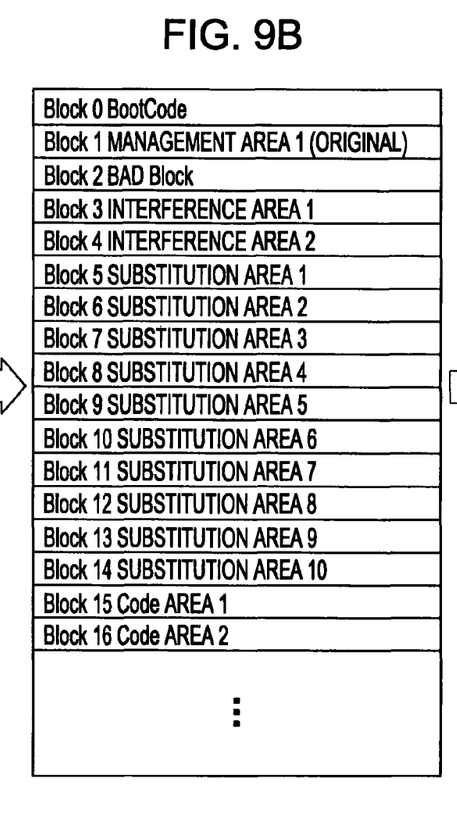
Figure 9C:
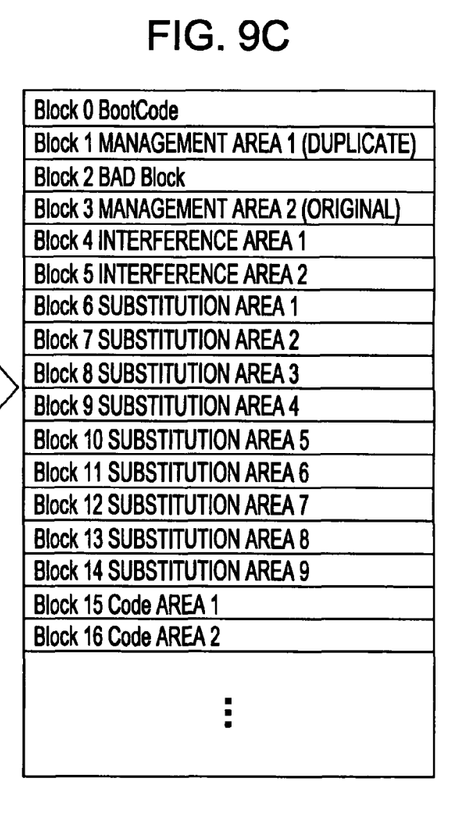

When new management information updated in the RAM in the state of part (a) of FIG. 9 is to be written into a "duplicate" area, in the case in which block 2 becomes a defective block as shown in part (b) of FIG. 9, as shown in part (c) of FIG. 9, an interference area of block 3 is allocated as a new "management area 2". The original "management area 2" is considered to be defective and is recorded in the management information in the RAM, and the management information that is updated by considering block 2 as being defective is written into the newly allocated "management area 2". As a result, the original "management area 1" becomes "duplicate", and the newly written "management area 2" becomes "original".

As a result of the block 3 becoming a management area, the interference areas 1 and 2 are shifted by an amount corresponding to one block and are moved to blocks 4 and 5. Predetermined data, such as 0xAA, is written into the interference area in advance, so that the interference area is used as an area for identifying a boundary between the code area 21 and the management area. In this embodiment, the same predetermined data as for the interference area has been written into an unused block of the substitution area. In such a case, no distinction can be made between the interference area and the substitution area in terms of data within the block. Even if the "interference areas 1 and 2 are shifted by an amount corresponding to one block", only the management information is changed, and there is no need to particularly perform a special writing process or the like on that substitution area in order to set one block of the substitution area as a new interference area.

As described above, the substitution area can be used not only to substitute for a defective block of the code area, but also to substitute for a management area, as shown in FIG. 9. However, unlike the substitution for a defective block of the code area, the substitution of the management area is performed by shifting the interference area. In the manner described above, by assigning functions of each block in such a manner that an interference area is interposed between the management area and the interference area in the memory space within the NAND memory 15b, the substitution area can be used effectively.

Instead, an implementation format is considered in which a fixed number of dedicated substitution areas is provided in the management area and a fixed number of substitution areas is provided in the code area. However, depending on the situation in which a defective block occurs in the management area and the code area, one of the substitution areas can become wasted. In comparison, as in this embodiment, the substitution area can be dynamically used for both the management area and the code area, and it is possible to effectively use all the blocks of the substitution area without waste.

In this embodiment, the substitution process can be continued until interference areas for two blocks cannot be allocated. After using up to the substitution area 1, it is detected that the next substitution area is for an interference area, and the substitution operation is stopped. This prevents the management area and the substitution area from overlapping each other.

In FIG. 9, etc., when the assignment of areas is to be changed, the areas are renumbered starting from 1. This is for the convenience of description, and numbers assigned to corresponding areas are not particularly important.

Figure 8:
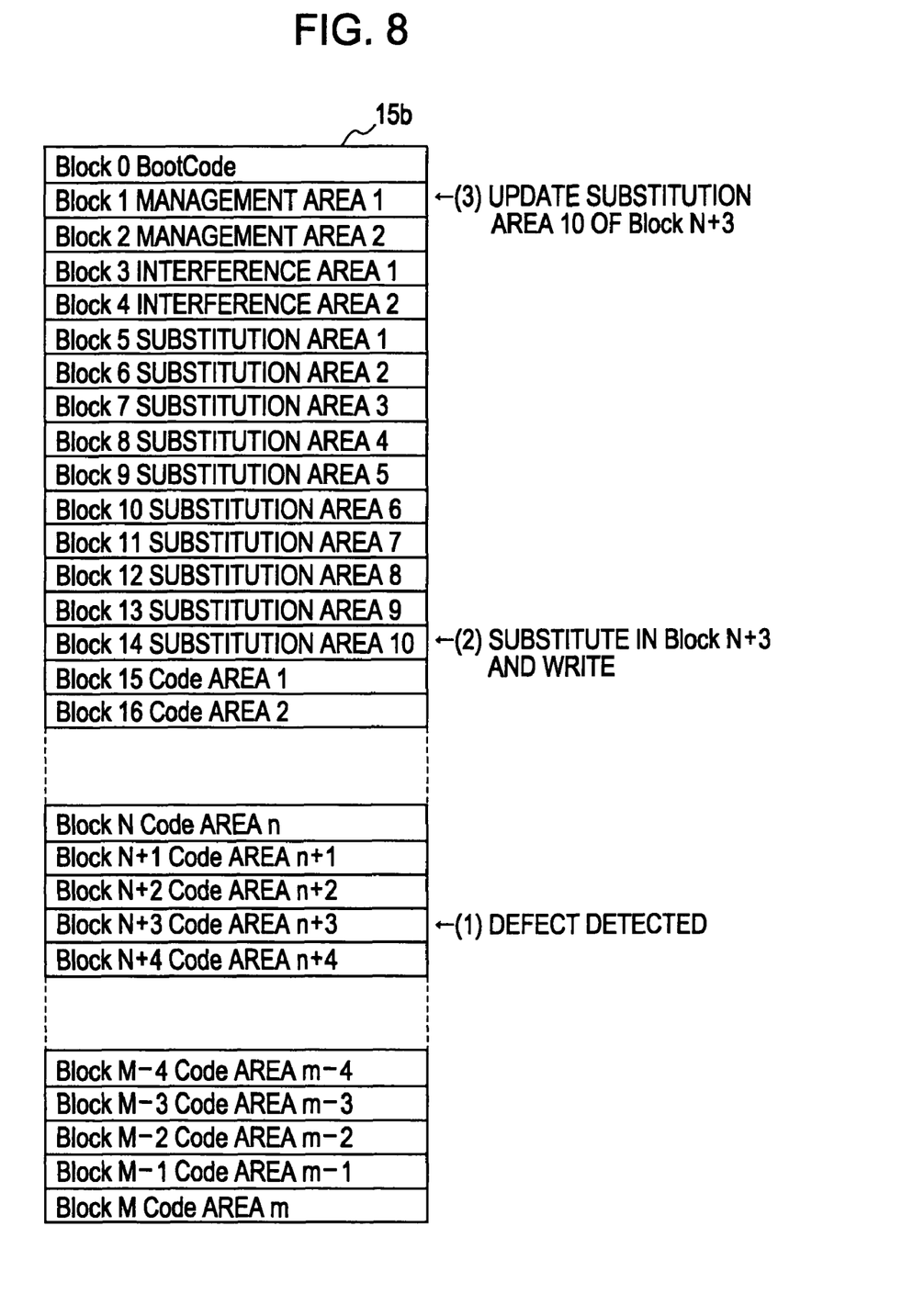
FIG. 8 illustrates a state in which a defective block of a code area is substituted for with a substitution area.

As shown in FIG. 8, the substitution of a defective block of the code area with a substitution area is performed using the block of the substitution area that is farthest from the interference area.

Figure 10:
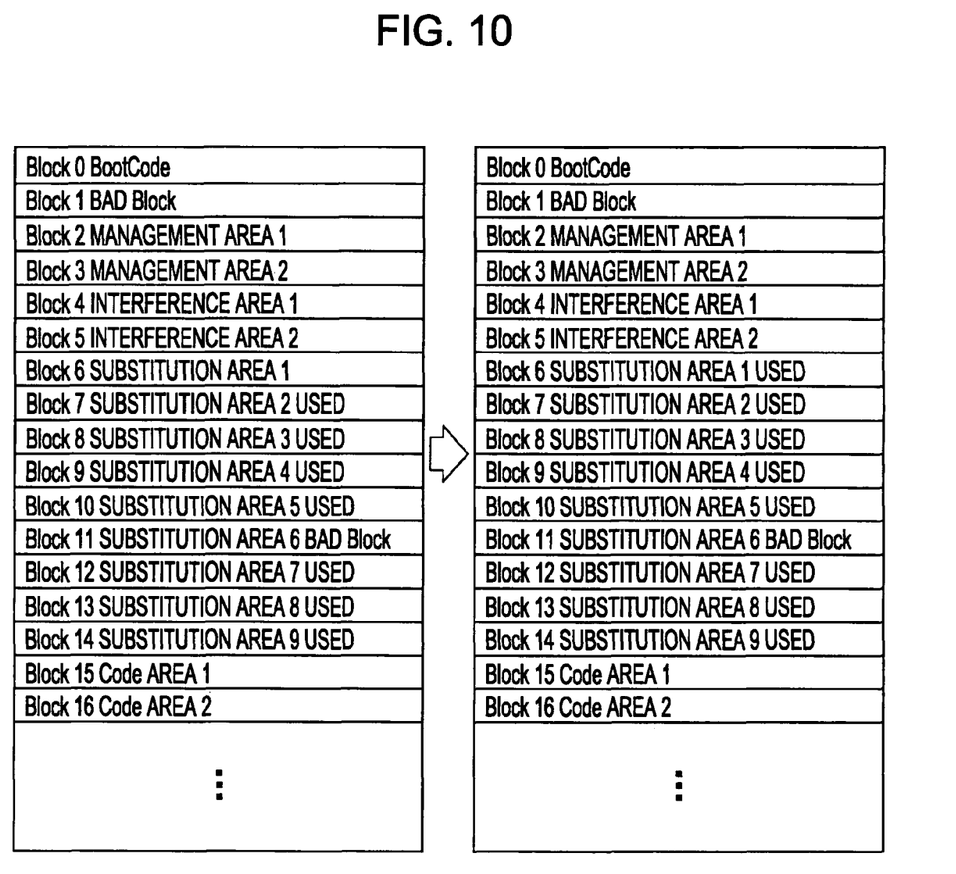
FIG. 10 shows a state in which the substitution area within a NAND memory is used up in an embodiment of the present invention.

FIG. 10 shows a state in which a defective block of a code area is substituted with a substitution area in the manner described above, the remaining substitution area becomes one block, a defect occurs in a block L (not shown) within the code area at that point in time, and the substitution area is used up. That is, the areas up to the substitution area 1 adjacent to the interference area 2 have been "used". Furthermore, as shown in block 11 of FIG. 10, there is a case in which a block within the substitution area becomes defective. In this case, this defective block is stored in the information 155 on defective blocks (FIG. 7) within the area for management and managed so that this block will not be used.

With the above configuration, by managing logical addresses within the management area, the continuity of the addresses of a program within the NAND memory is maintained. For this reason, even when there is a defective block in the NAND memory, it is possible for the software updating engine to perform software updating on the basis of a file for updating by referring to the management area.

Figure 11:
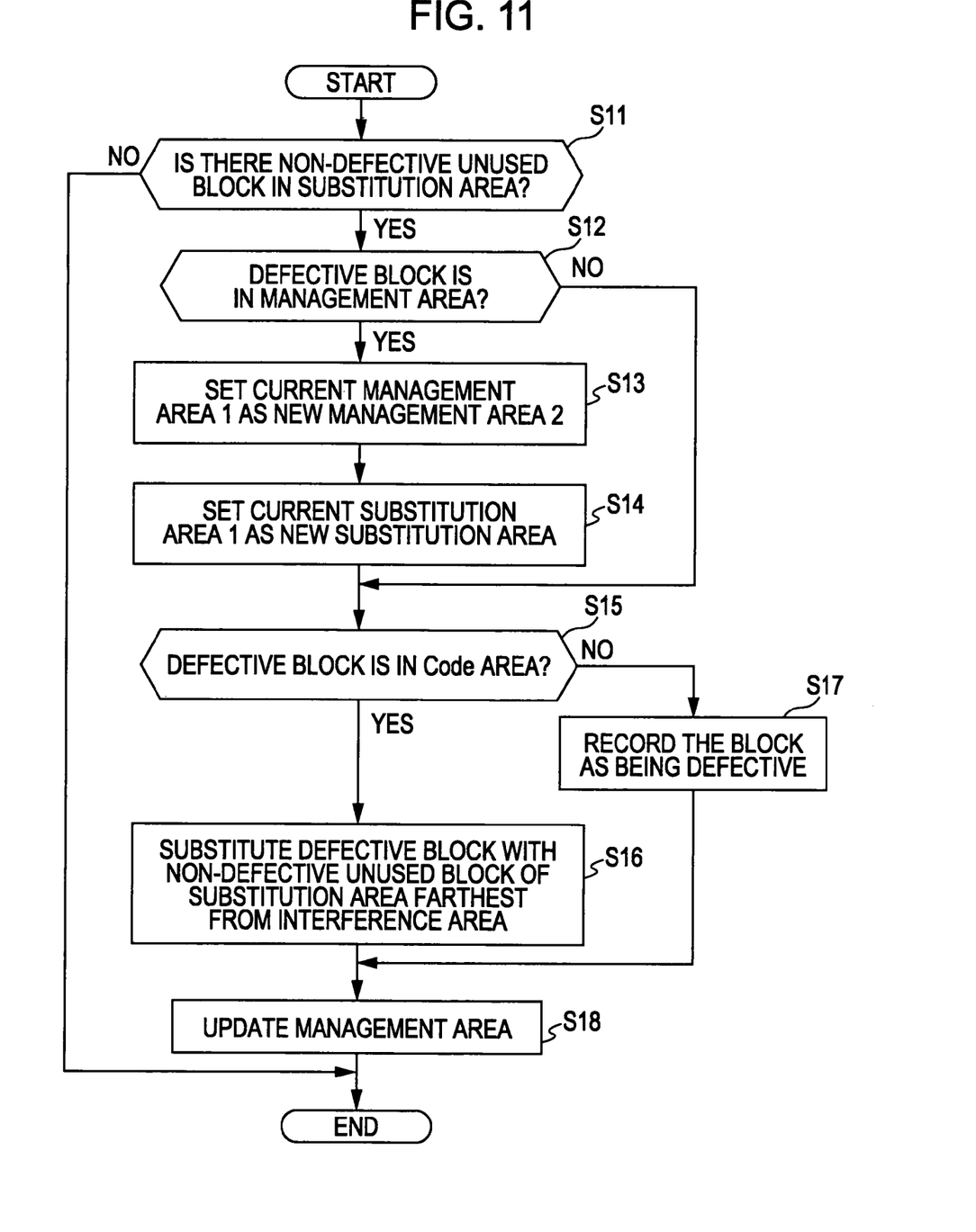
FIG. 11 is a flowchart showing a schematic process of a defective block substitution process performed after a defective block is found in an embodiment of the present invention.

FIG. 11 is a flowchart showing a schematic process of a defective block substitution process performed after a defective block is found. Defective blocks that occur late can be detected in steps S23 and S24 of FIG. 12 (to be described later) and in step S18 of FIG. 11.

In the processing of FIG. 11, at first, it is checked whether or not an unused non-defective block exists in the substitution area (S11). If it does not exist, this processing is completed. At this time, some message, such as an error message, may be displayed on a display section.

When an unused non-defective block exists, it is checked whether or not the defective block is a block in the management area (S12). If the defective block is not a block in the management area, the process proceeds to step S15. If it is a block in the management area, the current interference area 1 is set as a new management area (S13), and the current substitution area 1 is set as a new interference area 2 (S14).

In step S15, whether or not the defective block is a block in a code area is checked. When the defective block is not a block in the code area, the management information is updated by considering the block (block in the substitution area) as being defective (S17), and the process proceeds to step S18.

When the defective block is a block in the code area, the defective block is substituted for with an unused non-defective block of the substitution area, which is farthest from the interference area (S16).

Thereafter, the content of the block of the management area of the NAND memory 15b is updated (S18).

Figure 12:
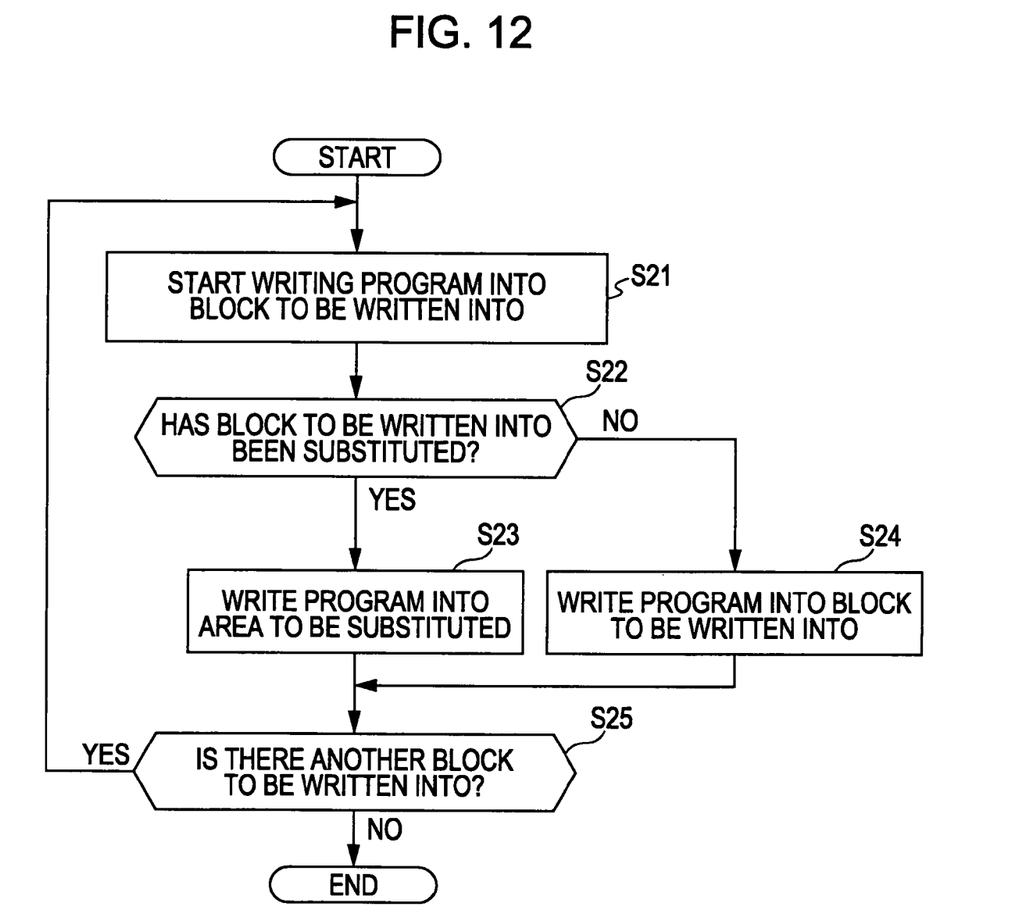
FIG. 12 is a flowchart showing a process for updating a program within a NAND memory on the basis of a file for updating in an embodiment of the present invention.

FIG. 12 is a flowchart showing a process for updating a program within the NAND memory 15b on the basis of a file for updating.

Initially, when a program is written into the NAND memory 15b (S21), whether a block to be written into has been substituted for with a substitution area is determined on the basis of the management information of the management area (original) (S22).

When a block to be written into has been substituted for, a program is written into an area to be substituted for (substitution block) specified by the management information (S23). When the block to be written into has not been substituted for, a program is written into an area to be written into (S24).

Figure 13:
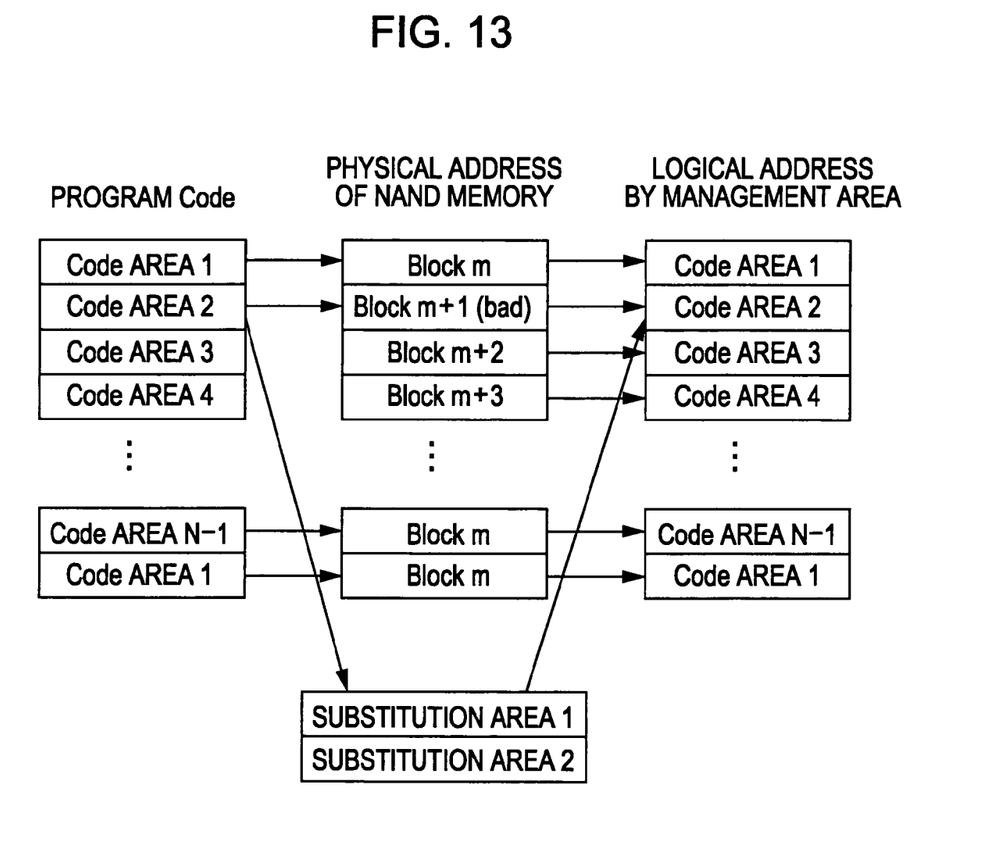
FIG. 13 shows the relationship between actual blocks corresponding to physical addresses of a NAND memory as a result of the substitution of a defective block and a code area corresponding to logical addresses in an embodiment of the present invention.

FIG. 13 shows the relationship between actual blocks corresponding to physical addresses of a NOR memory as a result of the substitution of a defective block and a code area corresponding to logical addresses.

The correspondence between physical addresses and logical addresses of the NAND memory 15b based on the management information of the management area enables the continuity of the logical addresses to be ensured even when there is a defective block in the NAND memory of the program before updating. There is no need to shift the content of the block within the NAND memory 15b by using the file for updating, and the updating of the program becomes possible.

When a program is to be transferred from the NAND memory 15b to the SDRAM 15a, it is possible to correctly transfer a program to a SDRAM by checking whether or not the substitution area is available in a similar manner.

Figure 14:
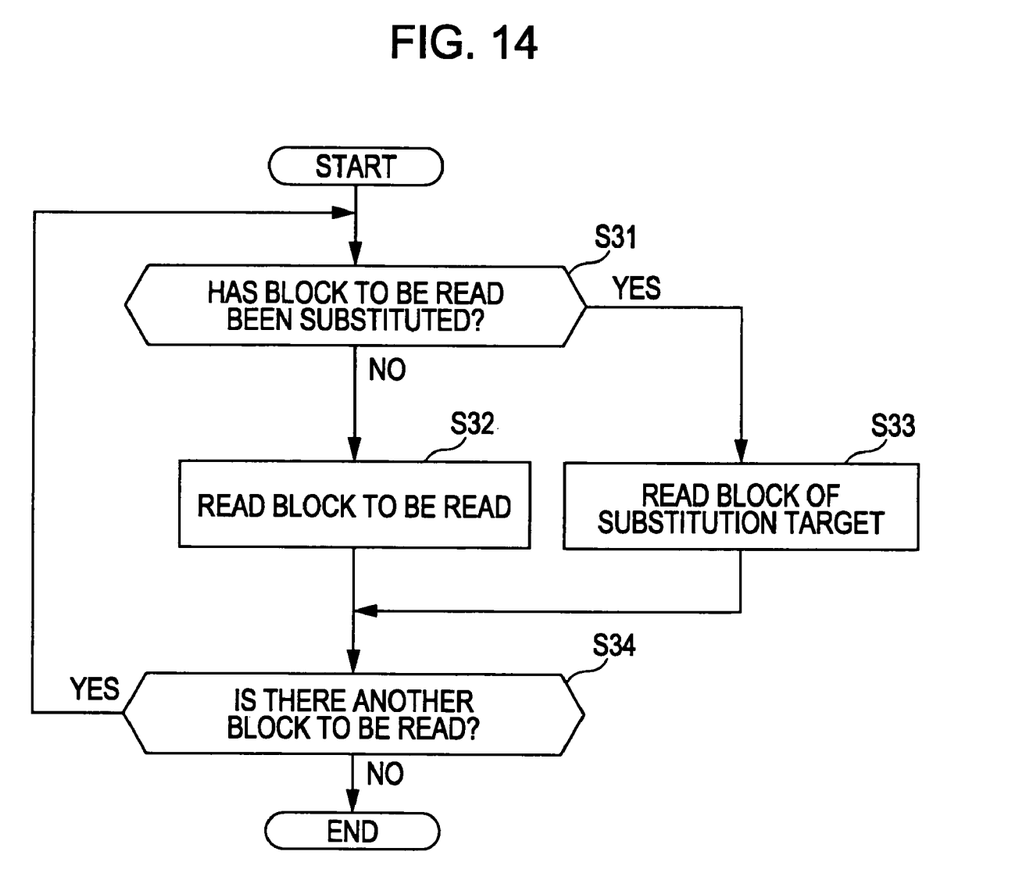
FIG. 14 is a flowchart showing a process of reading a NAND memory in an embodiment of the present invention.

FIG. 14 is a flowchart showing a process of reading the NAND memory 15b. At first, whether the block to be read has been substituted for on the basis of the management information (S31) is checked. If the block to be read has not been substituted for, the block to be read is read as it is (S32). If the block to be read has been substituted for, the substitution target block is read (S33). If there is another block to be read (S34), the process returns to step S31, and the above-described processing is repeated.

The present invention has been described by using a portable phone terminal as an example. However, the present invention is not limited to a phone terminal.

In the present invention, software difference updating has been described as a main application. The present invention is not limited to software difference updating, and it can be generally applied to a case in which the content of some blocks of a NAND memory need to be rewritten without exerting an influence on the other blocks.

The present invention can be suitably applied to a NAND-type flash memory, but it can also be applied to a NOR-type flash memory.

It should be understood by those skilled in the art that various modifications, combinations, sub combinations and alterations may occur depending on design requirements and other factors insofar as they are within the scope of the appended claims or the equivalents thereof.

What is claimed is:

1. A memory management method for managing a non-volatile memory into which writing is performed in units of blocks, the memory management method comprising the steps of:

assigning a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area;

storing at least correspondence information between a block of the substitution area and a defective block of a substitution target as management information within the management area; and using the block of the substitution area in place of the defective block on the basis of the correspondence information when the defective block is to be used, wherein, when a block of the management area becomes defective, the interference area is shifted to a block having a memory address closer to the interference area within the substitution area, so that one block of the original interference area is set as a new management area.

2. The memory management method according to claim 1, wherein the management information further comprises the number of used blocks of the substitution area or the number of unused blocks of the substitution area.

3. The memory management method according to claim 1 or 2, wherein the management information further comprises information on a defective block of the management information and/or the substitution area.

4. The memory management method according to claim 1, wherein at least two blocks for storing management information are used for the management area, and the management information includes generation information indicating the generation of the management information.

5. A memory management method for managing a non-volatile memory into which writing is performed in units of blocks, the memory management method comprising the steps of:

assigning a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area;

storing at least correspondence information between a block of the substitution area and a defective block of a substitution target as management information within the management area; and using the block of the substitution area in place of the defective block on the basis of the correspondence information when the defective block is to be used, wherein the blocks of the substitution area are used in an order starting from the block having a memory address farthest from the interference area.

6. A portable terminal device comprising:

a non-volatile memory into which writing is performed in units of blocks; and control means for assigning a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area, and for using the areas, wherein the control means stores at least correspondence information between a block of the substitution area and a defective block of a substitution target as management information within the management area, and uses the block of the substitution area in place of the defective block on the basis of the correspondence information when the defective block is to be used, and wherein, when a block of the management area becomes defective, the control means shifts the interference area to a block having a memory address closer to the interference area within the substitution area, so that one block of the original interference area is set as a new management area.

7. The portable terminal device according to claim 6, further comprising a random access memory capable of storing the program code, wherein, before executing program code within the non-volatile memory, the control means transfers the program code into the random access memory in units of blocks and executes the program code in the random access memory.

8. The portable terminal device according to claim 6, wherein, when the control means accesses one of the blocks within the code area of the non-volatile memory, the control means confirms the management information, and when the block of the substitution area is assigned to the target block, the control means uses the block of the substitution area in place of the target block.

9. The portable terminal device according to claim 6, wherein the management information further comprises the number of used blocks of the substitution area or the number of unused blocks of the substitution area.

10. The portable terminal device according to claim 6 or 9, wherein the management information further comprises information on a defective block of the management area and/or the substitution area.

11. The portable terminal device according to claim 6, wherein at least two blocks for storing management information are used for the management area, and the management information includes generation information indicating the generation of the management information.

12. A portable terminal device comprising:

a non-volatile memory into which writing is performed in units of blocks; and control means for assigning a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area, and for using the areas, wherein the control means stores at least correspondence information between a block of the substitution area and a defective block of a substitution target as management information within the management area, and uses the block of the substitution area in place of the defective block on the basis of the correspondence information when the defective block is to be used, and wherein the control means uses the blocks of the substitution area in an order starting from the block having a memory address farthest from the interference area.

13. A portable terminal device comprising:
a non-volatile memory into which writing is performed in units of blocks; and
a controller configured to assign a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area, and configured to use the areas,
wherein the controller stores at least correspondence information between a block of the substitution area and a defective block of a substitution target as management information within the management area, and
uses the block of the substitution area in place of the defective block on the basis of the correspondence information when the defective block is to be used, and
wherein, when a block of the management area becomes defective, the controller shifts the interference area to a block having a memory address closer to the interference area within the substitution area, so that one block of the original interference area is set as a new management area.

14. A portable terminal device comprising:
a non-volatile memory into which writing is performed in units of blocks; and
a controller configured to assign a plurality of blocks of the non-volatile memory to a management area formed of at least one block for storing management information, to a code area formed of a plurality of blocks into which program code is written, to a substitution area formed of a plurality of blocks for substituting for a defective block, and to an interference area formed of at least one block, the interference area being provided between the management area and the substitution area, and configured to use the areas,
wherein the controller stores at least correspondence information between a block of the substitution area and a defective block of a substitution target as management information within the management area, and
uses the block of the substitution area in place of the defective block on the basis of the correspondence information when the defective block is to be used, and
wherein the controller uses the blocks of the substitution area in an order starting from the block having a memory address farthest from the interference area.

* * * * *